(No Model.)

M. C. HOARD.
HOSE COUPLING.

No. 602,756.  Patented Apr. 19, 1898.

WITNESSES
H. H. Martin
Maud Schumacher

INVENTOR
Milo C. Hoard
By William Webster
Atty

UNITED STATES PATENT OFFICE.

MILO C. HOARD, OF TOLEDO, OHIO, ASSIGNOR OF ONE-HALF TO S. E. TODD, JR., OF SAME PLACE.

HOSE-COUPLING.

SPECIFICATION forming part of Letters Patent No. 602,756, dated April 19, 1898.

Application filed January 23, 1897. Serial No. 620,334. (No model.)

*To all whom it may concern:*

Be it known that I, MILO C. HOARD, of Toledo, county of Lucas, and State of Ohio, have invented certain new and useful Improvements in Hose-Couplings; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a hose-coupling, and has especial relation to a coupling for flexible hose, and also a relation to a hose-coupling as an article of manufacture adaptable to be sold as an entirety to be used in the union of two sections of hose.

The object of the invention is to provide means for uniting two sections of hose in an arbitrary relation without abrasion of the fabric of the hose or the possibility of leakage.

A further object is to provide a coupling for the union of a plurality of sections of hose in which the coupling shall have a uniform bearing upon the exterior of the telescopic member of the coupling with a concentric bearing coincident therewith and having a progressive advancement to increase the frictional engagement of the hose.

A further and exceedingly important object is to provide a coupling in which the entire device is complete within itself and adaptable to be sold as an article of manufacture with each element (irrespective of its movability with its coacting element) yet fixedly retained with relation thereto.

Figure 1:
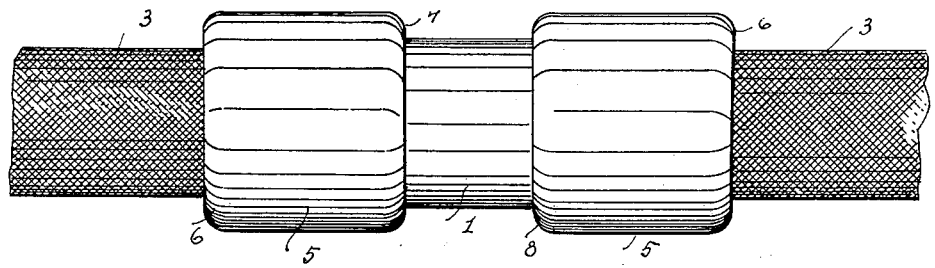
Figure 2:
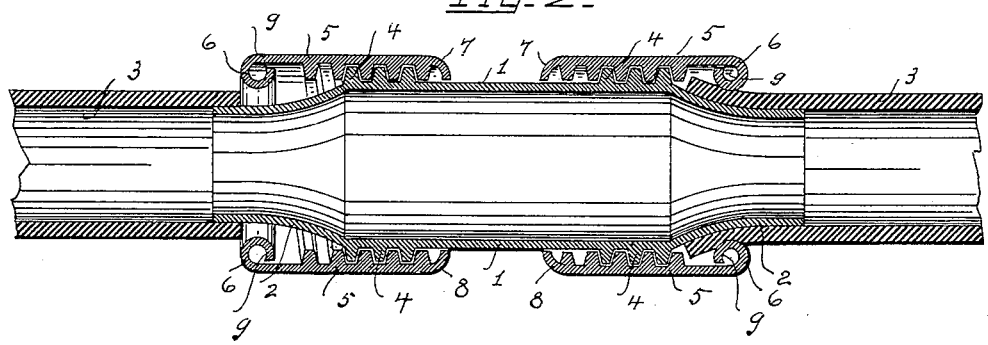
Figure 3:
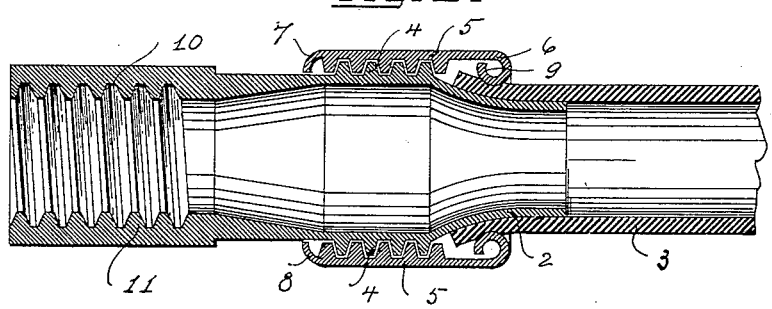

In the drawings, Figure 1 is an elevation of two sections of hose united by means of my coupling. Fig. 2 is a longitudinal vertical section of the coupling, showing upon the right-hand side a sectional elevation of hose properly coupled by means of the progressive advancement of the revoluble impinging section and upon the left-hand side a section of hose apt to be advanced upon the conical tubular end of the section to be engaged with the concentric frictional annulus controllable in progressive advancement or retraction by the screw-thread. Fig. 3 is a longitudinal vertical section, showing the coupling bisected, the one-half maintaining the common features and internally threaded to be run upon a threaded water-cock.

It is my essential idea to provide a coupling that can be employed in the union of hose-sections without abrasion of the hose, the use of a wrench, or the possibility of loss of the essential member employed in compression of the hose. I have further discovered that a valuable and operative hose-coupling can be produced having a minimum lightness commensurate with strength and convenience of manipulation by stamping the male member with conical ends to receive the hose, and marginal threads with end sections also stamped with coincident threads and non-abrading impinging forward ends, whereby the section can be sold as an article of manufacture and be used in ordinary domestic use in securing sections of hose together.

The value of this invention so far described would be somewhat limited—to wit, in the feature of the possibility of the threaded sections upon the male member to be disengaged and lost. I have therefore provided for a flexible or radially-compressible internal end to the encompassing internally-threaded section upon the male member, whereby the compression shall form a radius of less diameter than the greater diameter of the thread upon the male member, thereby always holding the sections upon the male member.

1 designates the male member, formed with conically-tapering ends 2 2, upon which the hose-sections 3 3 are initially mounted. Section 1 is formed at each end with a screw-thread 4.

5 designates internally-threaded sleeves having an annulus 6 of less diameter and of a diameter less than the greater diameter of the conical ends 2. Sleeves 5 are also formed at their inner ends with a flexible diaphragm or end annulus 7, capable of being flexed to form an annulus 8 of less diameter than the maximum diameter of the thread 4 of the male member 1.

In operation so far as described the hose 3 is initially run upon the conical ends 2 of the coupling. The sleeves 5 are advanced by revolution to a point to cause the annulus 6 to engage therewith, when by a revoluble movement of the sleeves to advance the same upon the male member the hose is drawn upon the conical end to a sufficient degree to cause the increase of radius of the conical portion to cause the annulus to depress into the hose and hold the same in place.

The object of the diaphragm 7 is to permit of flexing the same, as shown at 8, to a smaller circumference than the maximum diameter of the screw-thread upon the male member, so that either in selling the coupling as an article of manufacture or as using the same thereafter the sections are always held upon the male member of the coupling without possibility of loss or displacement.

In forming the sleeves 5 it will be noticed that I prefer to form the annulus 6 by coiling the metal, as at 9, thereby providing a smooth surface to the hose.

In the illustration shown in Fig. 3 the essential features which preserve the end 10 are merely shown in illustration of a preferred form of attaching the coupling to a water-cock in which the revoluble nut 11 is internally screw-threaded to run upon the external thread of the water-cock.

While the coupling as described can be made in any of the well-known forms, it will be seen that the male member may be drop-forged without subsequent fitting and also that the sleeves may be stamped or died without machine-fitting, and while I do not propose to limit my invention to any particular form or method of producing the same, yet I prefer to stamp the parts from aluminium or other analogous or light material, thereby obviating the extraneous weight heretofore observed in mending or coupling hose-sections.

While I have used the term "conical" as applying to the ends of the male member, it will be observed that the reduction of diameter from maximum to minimum describes a hyperbola, which has been found by experiment conducive to greater success in assembling the hose with the male member than the construction literally described as conical.

What I claim is—

1. In a hose-coupling, a male member having conical ends, marginal screw-threads, and sleeved sections upon the male member having concentric impinging portions with inner contracted ends.

2. In a hose-coupling, a male member having conical ends, marginal screw-threads, and sleeved sections upon the male member having concentric impinging portions with inner contracted ends formed by compressible diaphragms.

In testimony that I claim the foregoing as my own I hereby affix my signature in presence of two witnesses.

MILO C. HOARD.

Witnesses:
WILLIAM WEBSTER,
MAUD SCHUMACHER.